US012102592B1

(12) United States Patent
Zhu

(10) Patent No.: US 12,102,592 B1
(45) Date of Patent: Oct. 1, 2024

(54) MOTOR-LINKED BLOWING AND SUCKING STRUCTURE AND HEALTH CARE TOOL USING SAME

(71) Applicant: Li Zhu, Shenzhen (CN)

(72) Inventor: Li Zhu, Shenzhen (CN)

( * ) Notice: Subject to any disclaimer, the term of this patent is extended or adjusted under 35 U.S.C. 154(b) by 0 days.

(21) Appl. No.: 18/646,416

(22) Filed: Apr. 25, 2024

(51) Int. Cl.
*A61H 9/00* (2006.01)

(52) U.S. Cl.
CPC ......... *A61H 9/0007* (2013.01); *A61H 9/0057* (2013.01); *A61H 9/0071* (2013.01); *A61H 2201/1215* (2013.01); *A61H 2201/5007* (2013.01)

(58) Field of Classification Search
CPC ................ A61H 9/0007; A61H 9/0057; A61H 9/0071; A61H 2201/1215; A61H 2201/5007; A61H 7/00; A61H 7/001; A61H 7/008; A61H 9/005; A61H 2201/0153; A61H 2201/0157; A61H 2201/12; A61H 2201/1207; A61H 2201/168; A61H 19/30–34; A61H 19/40–50; A61H 21/00; A61H 23/006; A61H 23/02; A61H 23/0254
USPC .............................................................. 601/9
See application file for complete search history.

(56) References Cited

U.S. PATENT DOCUMENTS 3,094,983 A * 6/1963 MacLeod ............... A61H 9/005 601/166
11,833,100 B1 * 12/2023 Liu ...................... A61H 9/0057
11,833,102 B1 * 12/2023 Liu .................... A61H 23/0263
2007/0100259 A1 * 5/2007 Nan ....................... A61H 9/005 601/7
2014/0323931 A1 * 10/2014 Avni ...................... A61M 11/00 601/46
2015/0065931 A1 * 3/2015 Alnabulsi .............. A61B 5/349 601/152
2022/0015983 A1 * 1/2022 Li ...................... A61H 23/0218
2022/0175612 A1 * 6/2022 Witt ....................... A61H 19/30
2023/0383737 A1 * 11/2023 Zhong Dong ......... A61H 9/005

FOREIGN PATENT DOCUMENTS

DE 202021103834 U1 * 10/2021 ........... A61H 23/006

* cited by examiner

*Primary Examiner* — Rachel T Sippel
*Assistant Examiner* — Benjamin M. Kusiak
(74) *Attorney, Agent, or Firm* — Jeenam Park

(57) ABSTRACT

A motor-linked blowing and sucking structure and a health care tool using the same, the motor-linked blowing and sucking structure including a cavity tube and a linkage. A swinging vane is disposed in the cavity tube, and a side wall of the swinging vane fits into an inner wall of the cavity tube; one end of the linkage is connected to a drive motor and the other end of the linkage is connected to the swinging vane; the drive motor rotates to drive the linkage; and the linkage as an engagement structure allows a fan-shaped reciprocating motion of the swinging vane within the cavity tube to achieve a higher transmission ratio and a larger torque, such that a larger amplitude of motion can be achieved with the same spatial structure, achieving a more significant air blowing and sucking effect at an opening of the cavity tube.

8 Claims, 5 Drawing Sheets

MOTOR-LINKED BLOWING AND SUCKING STRUCTURE AND HEALTH CARE TOOL USING SAME

TECHNICAL FIELD

The present disclosure relates to the field of transmission structures for health care tools, and in particular, to a motor-linked blowing and sucking structure and a health care tool using the same.

BACKGROUND

In the development of society, many individuals are in a sub-health state, in which the individuals may not have obvious diseases, but feel sick physically or psychologically. Gradually, people make use of health care tools to help alleviate the sub-health state. Moreover, with the gradual electrification of the health care tools, the health care tools can fulfill functions such as tapping, vibrating, or blowing and sucking in a massage fashion. Here, to achieve the blowing and sucking function, a linked motor and a piston sleeved on an output shaft of the motor to make a reciprocating motion are generally included in terms of structure, and a working end of the piston coordinates with a movable cavity in an air blowing device to achieve the air blowing and sucking effect. However, in actual use, it has found that the aforementioned structural components coordinate in a complex way and produce small blowing and sucking forces, which cannot provide satisfactory working intensity to a user. Therefore, there is an urgent need for a solution with more rational structure to overcome the defects mentioned above.

SUMMARY

In view of the technical problems of low sucking and blowing intensity and complex structure of the piston type blowing and sucking structure in the prior art, the present disclosure provides a solution.

To achieve the above object, the present disclosure provides a motor-linked blowing and sucking structure, including:

- a cavity tube, in which a swinging vane is disposed, a side wall of the swinging vane fitting into an inner wall of the cavity tube; and
- a linkage, one end of which is connected to a drive motor and the other end of which is connected to the swinging vane,
- wherein the linkage follows rotation of the drive motor to allow for a fan-shaped reciprocating motion of the swinging vane, thereby achieving an air blowing and sucking effect at an opening end of the cavity tube.

A first opening and a second opening are provided at both ends of the cavity tube; an end of the linkage away from the drive motor is connected to the swinging vane by means of the first opening; and when the swinging vane is located at a first limit position or a second limit position during the fan-shaped reciprocating motion, an air blowing and sucking effect is achieved at the second opening.

The cavity tube is an arc-shaped tube and further includes an arc-shaped bridge, one end of which is connected to the linkage and the other end of which is connected to the swinging vane by means of the first opening; the linkage further includes a rotating shaft, and the swinging vane makes the fan-shaped reciprocating motion by taking the rotating shaft as a circle center; and a radian center formed by the cavity tube is an axis center of the rotating shaft.

An end surface at an end of the linkage away from the drive motor is an arc surface, which fits into an inner arc portion formed by the cavity tube.

An eccentric shaft is sleeved on an output shaft of the drive motor, an end of the linkage close to the drive motor is provided with a first protrusion and a second protrusion, between which a preset spacing is present; and the eccentric shaft is located within the preset spacing, and is reciprocatively butted against opposing surfaces of the first and second protrusions following the rotation of the drive motor, to drive the swinging vane to make the fan-shaped reciprocating motion.

A seal ring is sleeved on an outer wall of the swinging vane.

A health care tool is also provided, which includes a main body, wherein a battery, the blowing and sucking structure mentioned above, and a master control board are disposed in the main body, and the drive motor and the battery are connected to the master control board, respectively.

The present disclosure has the following advantageous effects: compared with the prior art, the present disclosure provides the motor-linked blowing and sucking structure and the health care tool using the same; the blowing and sucking structure includes the cavity tube and the linkage; the swinging vane is disposed in the cavity tube; the drive motor rotates to drive the linkage; and the linkage as an engagement structure allows for a fan-shaped reciprocating motion of the swinging vane within the cavity tube to achieve a higher transmission ratio and a larger torque; and accordingly, a larger amplitude of motion can be achieved with the same spatial structure to allow for larger amplitude of adjustment of parameters for balancing air pressure inside and outside the cavity tube, thereby achieving a more significant air blowing and sucking effect at an opening of the cavity tube.

The reference signs of main elements are illustrated as follows:

1, cavity tube; 11, first tube shell; 12, second tube shell; 13, inner arc portion; 16, seal groove;

17, blowing and sucking opening; 2, swinging vane; 21, seal ring; 3, linkage; 31, arc bridge; 32, rotating shaft; 33, arc surface; 34, first protrusion; 35, second protrusion; 4, drive motor; 5, eccentric shaft;

51, eccentric column; 52, flexible sleeve; 6, main body.

DETAILED DESCRIPTION

To more clearly set forth the present disclosure, the following further describes the present disclosure in conjunction with the accompanying drawings.

It should also be understood that, when the terms "comprise" and/or "include" are used in the Description, they indicate the presence of the stated feature, entirety, step, operation, element or assembly, but do not exclude the presence or addition of one or more other features, entireties, steps, operations, elements, assemblies or their combinations. Now, the exemplary embodiments according to the present disclosure will be described in more detail with reference to the accompanying drawings.

Figure 1:
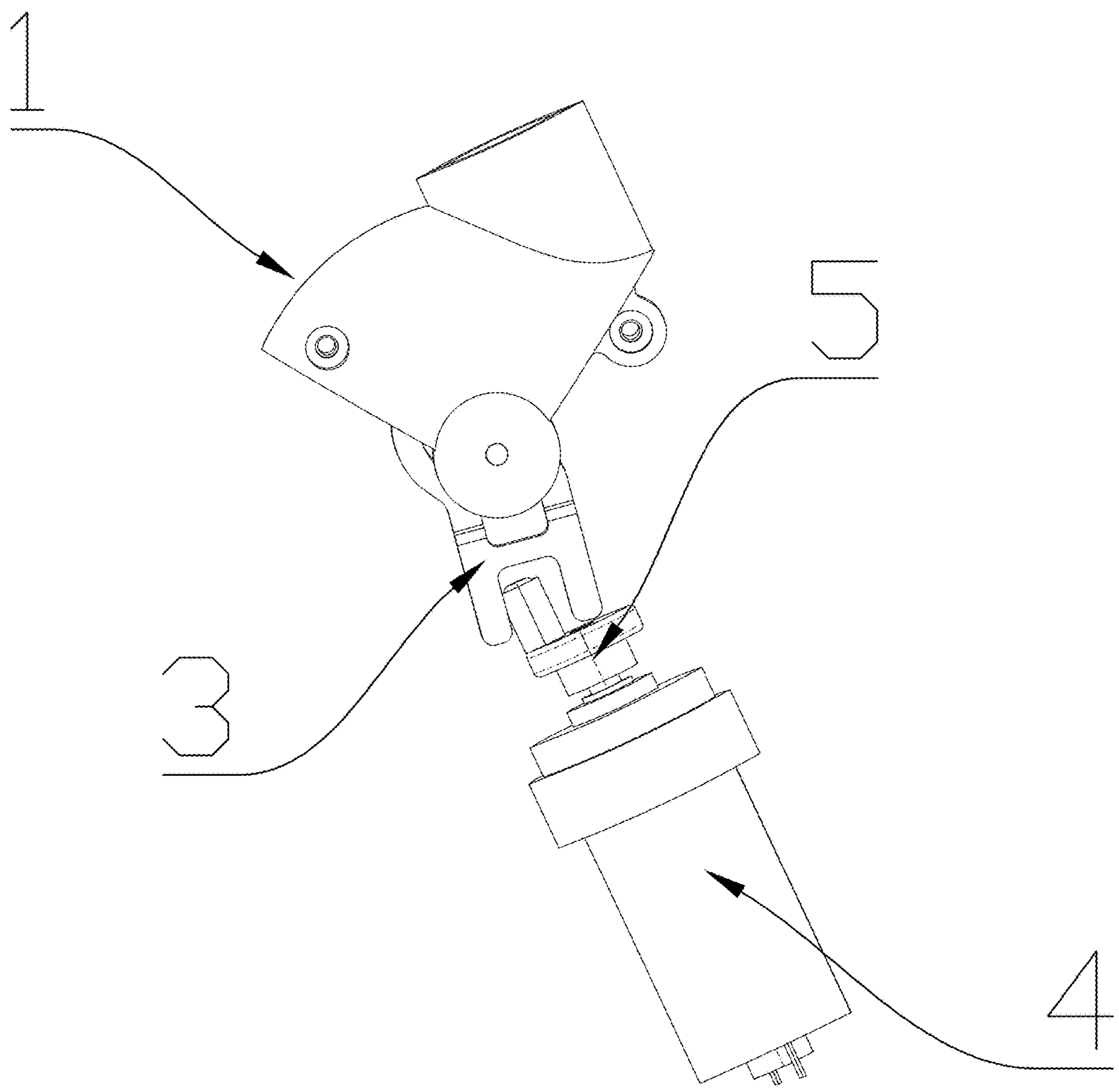
FIG. 1 shows a stereogram according to the present disclosure.
Figure 2:
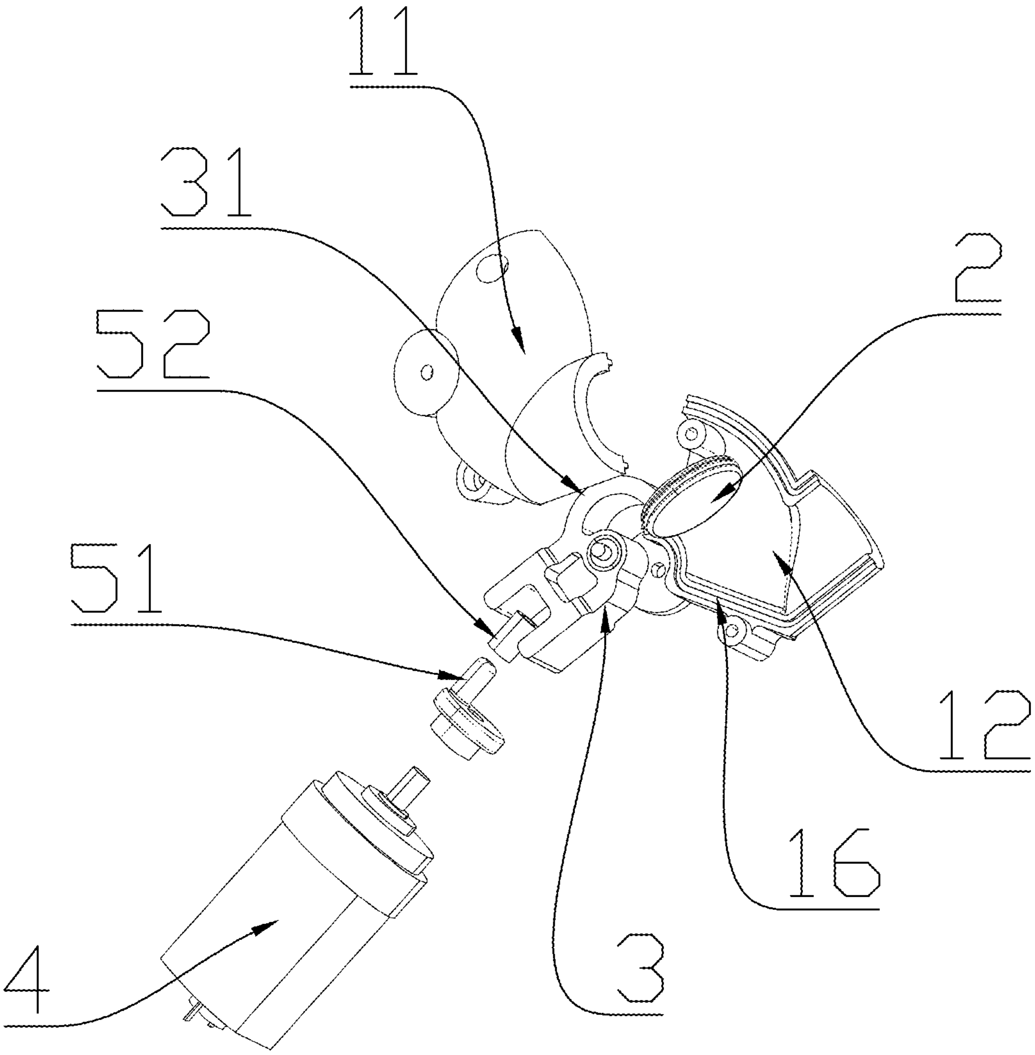
FIG. 2 shows an exploded view according to the present disclosure.
Figure 3:
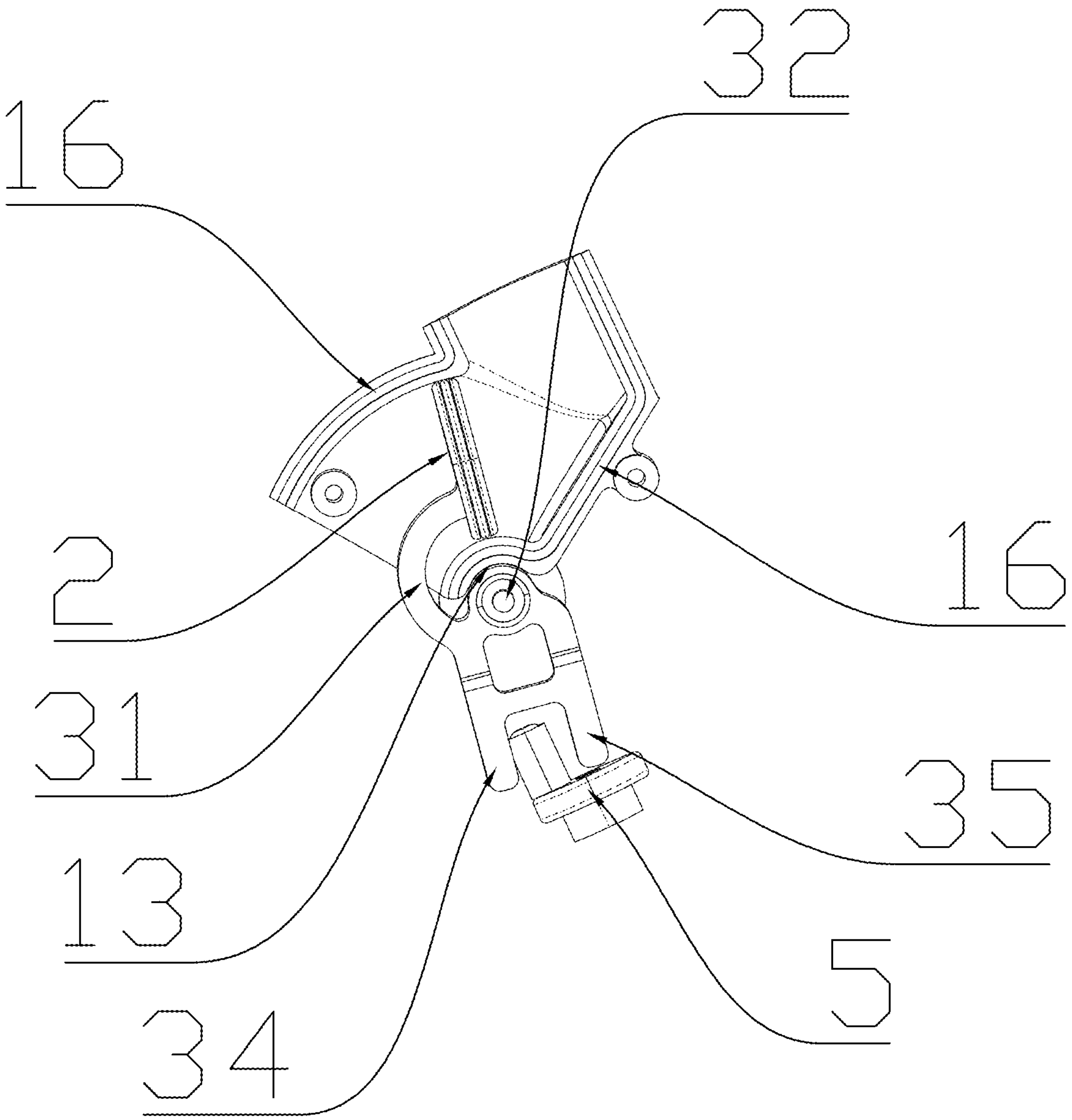
FIG. 3 shows a schematic diagram of the coordination of a linkage, an eccentric shaft, and a cavity tube according to the present disclosure.
Figure 4:
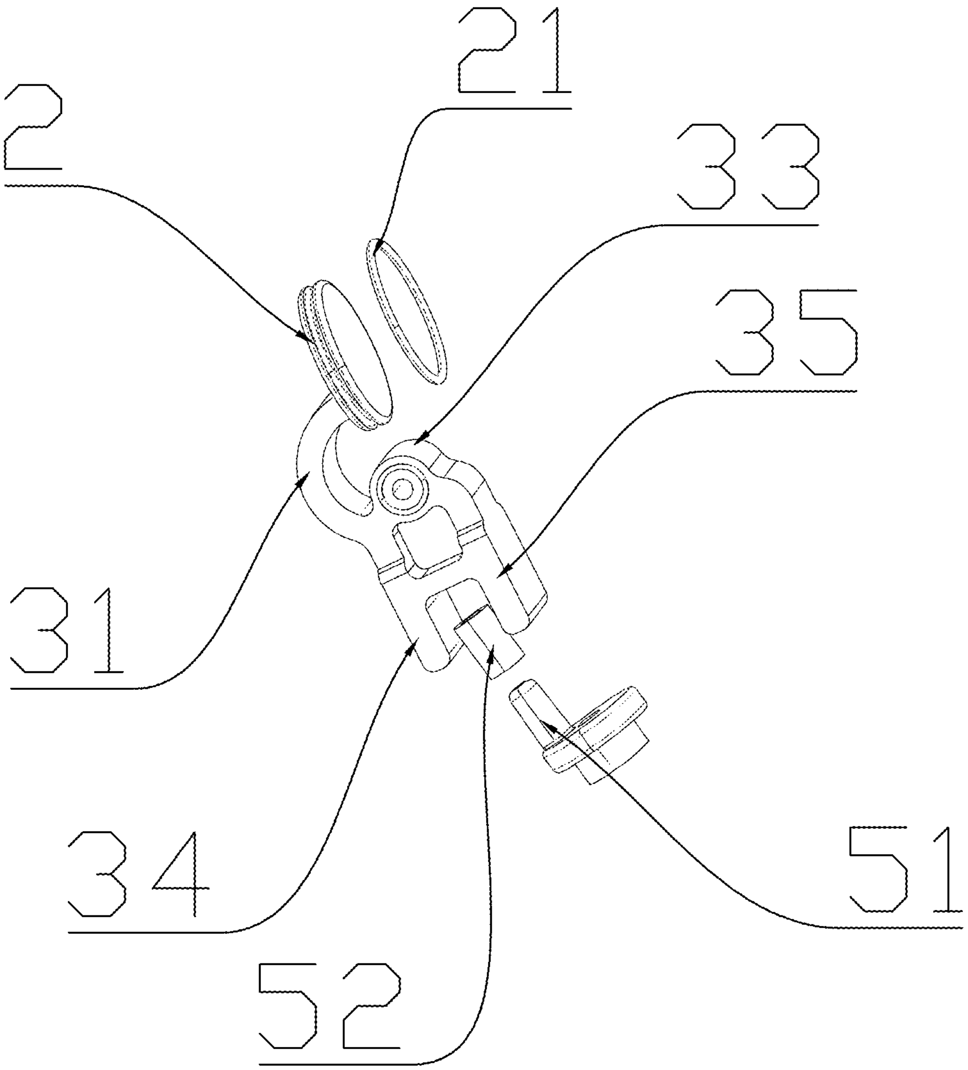
FIG. 4 shows a schematic diagram of the coordination of a linkage and a swinging vane according to the present disclosure.
Figure 5:
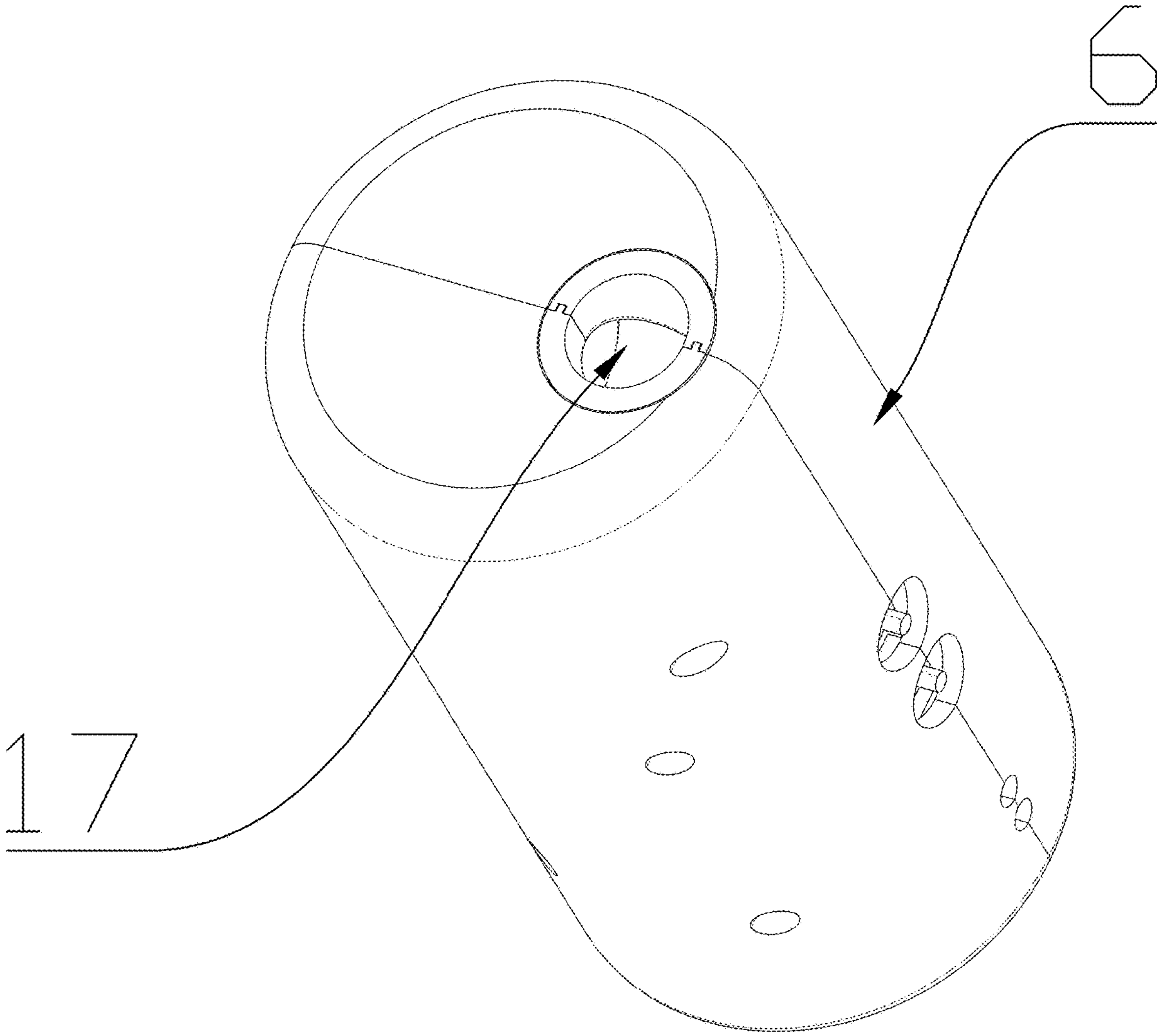
FIG. 5 shows a schematic structural diagram of a health care tool using the present application.

To solve the technical problems of low sucking and blowing intensity and complex structure of the piston type blowing and sucking structure in the prior art, the present application provides a motor-linked blowing and sucking structure. Referring to FIG. 1 to FIG. 5, the motor-linked blowing and sucking structure includes a cavity tube 1 and a linkage 3; a swinging vane 2 is disposed in the cavity tube 1, and a side wall of the swinging vane 2 fits into an inner wall of the cavity tube 1; and one end of the linkage 3 is connected to a drive motor 4 and the other end of the linkage 3 is connected to the swinging vane. Here, the linkage 3 follows the rotation of the drive motor 4 to allow for a fan-shaped reciprocating motion of the swinging vane, thereby achieving an air blowing and sucking effect at an opening end of the cavity tube 1.

In the above embodiment, the drive motor 4 rotates to drive the linkage 3; and the linkage 3 as an engagement structure allows for a fan-shaped reciprocating motion of the swinging vane 2 within the cavity tube 1. The linkage 3 acts like a sector gear and can achieve a higher transmission ratio and a larger torque. Accordingly, a larger amplitude of motion can be achieved with the same spatial structure to allow for larger amplitude of adjustment of parameters for balancing air pressure inside and outside the cavity tube 1, thereby achieving a more significant air blowing and sucking effect at an opening of the cavity tube 1. Furthermore, the volume is compacter and the structure is simpler.

In a specific solution, a first opening and a second opening are provided at both ends of the cavity tube 1; an end of the linkage 3 away from the drive motor 4 is connected to the swinging vane 2 by means of the first opening; and when the swinging vane 2 is located at a first limit position or a second limit position during the fan-shaped reciprocating motion, an air blowing and sucking effect is achieved at the second opening. For the sake of better statement of the present solution, for example, when the swinging vane 2 moves from the first limit position to the second limit position to expel air out of the second opening from the cavity tube 1, an air blowing effect is achieved; on the contrary, when the swinging vane 2 moves from the second limit position to the first limit position to draw air from the environment into the cavity tube 1 via the second opening, an air sucking effect is achieved. The swinging vane 2 reciprocates between the first limit position and the second limit position under the coordination between the drive motor 4 and the linkage 3, to thus achieve the air blowing and sucking effect.

If a connection hole is provided in the outer wall of the cavity tube 1 and the linkage 3 is threaded into the connection hole to implement the swinging of the swinging vane 2, the air is prone to flowing out of the connection hole during the fan-shaped reciprocating motion, leading to decreased air blowing and sucking intensity. Therefore, in this embodiment, the cavity tube 1 is an arc-shaped tube and further includes an arc-shaped bridge 31, one end of which is connected to the linkage 3 and the other end of which is connected to the swinging vane 2 by means of the first opening; the linkage 3 further includes a rotating shaft 32, and the swinging vane 2 makes the fan-shaped reciprocating motion by taking the rotating shaft 32 as a circle center; and a radian center formed by the cavity tube 1 is overlapped with an axis center of the rotating shaft 32. It is readily understandable that the cavity tube 1 as the arc-shaped tube may facilitate the assembly and use of the arc-shaped bridge 31 by means of the first opening; an inner arc region in the arc-shaped bridge 31 may avoid the end of the cavity tube 1 and allow for larger swing of the swinging vane 2, such that the ability to adjust the air pressure is further increased to acquire a larger capacity of air blowing and sucking. It is worth emphasizing that the first and second openings of the cavity tube 1 here are still retained, without the addition of extra hole or opening structure, such that early air leakage and additional air intake are prevented when the cavity tube 1 works, and the stability in differential pressure formation is ensured.

In a more preferred solution, an end surface at an end of the linkage 3 away from the drive motor 4 is an arc surface 33, which fits into an inner arc portion 13 formed by the cavity tube 1, such that the relative positions among the linkage 3, the drive motor 4, and the cavity tube 1 are further compressed to allow for a compacter structure. Furthermore, the coordination with high transmission ratio and large torque among the aforementioned linkage 3, motor 4, and swinging vane 2 prevents the air blowing and sucking from being decreased due to the compressed assembly space of components. In a more preferred solution, turnplates are disposed on both sides of the cavity tube 1 and are movably sleeved on the rotating shaft 32 correspondingly to cover the arc surface 33 and the inner arc portion 13, such that the stability of the relative motion between the linkage 3 and the cavity tube 1 is increased.

In a specific transmission solution, an eccentric shaft 5 is sleeved on an output shaft of the drive motor 4, and an end of the linkage 3 close to the drive motor 4 is provided with a first protrusion 34 and a second protrusion 35, between which a preset spacing is present; and the eccentric shaft 5 is located within the preset spacing, and is reciprocatively butted against opposing surfaces of the first and second protrusions 34 and 35 following the rotation of the drive motor 4, to drive the swinging vane 2 to make the fan-shaped reciprocating motion. It is readily understandable that the eccentric shaft 5 consists of an assembly plate and an eccentric column 51; the assembly plate coaxially is sleeved on the output shaft of the drive motor 4; the eccentric column 51 is assembled on a surface of the assembly plate away from the drive motor 4, and the central axis of the eccentric column 51 is different from the central axis of the assembly plate; when the drive motor 4 rotates, the eccentric column 51 forms a first contact position and a second contact position in directions corresponding to the first protrusion 34 and the second protrusion 35. Specifically, for example, when the eccentric column 51 rotates to the first contact position, the eccentric column 51 is butted against the first protrusion 34, the linkage 3 swings based on the rotating shaft 32, the arc-shaped bridge 31 actuates the swinging vane 2, such that the swinging vane 2 moves toward the second opening to reach the second limit position, thereby expelling the air out of the second opening from a cavity to achieve an air blowing effect. In a similar way, when the eccentric column 51 rotates to the second contact position, the eccentric column 51 is butted against the second protrusion 34, the linkage 3 swings based on the rotating shaft 32, the arc-shaped bridge 31 pulls the swinging vane 2 to finally allow the swinging vane 2 to move toward the first opening to reach the first limit position, thereby sucking the air outside the cavity via the second opening to achieve an air sucking effect. The reciprocation of the aforementioned coordination allows for a cyclic air sucking and blowing effect. Furthermore, when the eccentric column 51 is butted against the first protrusion 34 or the second protrusion 35, the cavity tube 1 is allowed to vibrate at a corresponding frequency, which expands the function. In a more preferred solution, a flexible sleeve 52 is sleeved on the eccentric column 51 to prevent the service life from being reduced under the excessive impact pressure during butting, thereby allowing for smoother air blowing and sucking and eliminating the sound resulting from impacts.

In this embodiment, a seal ring 21 further is sleeved on an outer wall of the swinging vane 2. The seal ring 21 can guarantee the seal fit between the swinging vane 2 and the cavity tube, ensuring the stability of air pressure formed during air blowing and sucking.

In a specific solution, the cavity tube 1 is formed by closing a first tube shell 11 and a second tube shell 12. From the aforementioned embodiment, it can be clearly seen that, if the cavity tube 1 is fabricated integrally, the difficulty in assembling the swinging vane 2 doubtlessly increases. Therefore, by dividing the cavity tube 1 into the first tube shell 11 and the second tube shell 12 by means of modularization, a technician may conduct assembly in an assembling order of the first tube shell 11, the swinging vane 2, and the second tube shell 12, to thus achieve higher assembly efficiency.

In a preferred solution, to solve the problem on airtightness caused by modular assembly, the opposing bonding surfaces of the first tube shell 11 and the second tube shell 12 in this embodiment are each provided with a seal groove 16, and a seal medium is accommodated in a seal channel formed by the two seal grooves 16. The sealing medium may be a soft silicon gel strip or a sealant or the like, which can ensure the airtightness of the cavity tube 1 and avoid impacts to the intensity of air blowing and sucking.

The present application further provides a health care tool, which includes a main body 6. A battery, the aforementioned blowing and sucking structure, and a master control board are disposed in the main body 6, and the drive motor 4 and the battery are connected to the master control board, respectively. In this embodiment, the health care tool includes the features of the aforementioned blowing and sucking structure, to thus achieve the same advantages effects and functions as the aforementioned blowing and sucking structure.

In a preferred solution, one end of an extension tube is connected to the opening of the cavity tube 1, and the other end of the extension tube protrudes out of the outer wall of the main body 6 to form a blowing and sucking opening 17. By means of the extension tube, the blowing and sucking opening 17 can be arbitrarily arranged on the main body 6 as expected, such that the structural arrangement is more flexible.

The present disclosure has the following advantages:

by the coordination of the linkage, the cavity tube, and the swinging vane, the present application achieves a simple transmission structure and has excellent characteristics such as stronger air blowing and sucking, appropriate spacing and volume, and excellent air blowing and sucking effect.

The above disclosure only provides several specific embodiments of the present disclosure, which is not limited thereto. Any variation conceivable to a person skilled in the art shall fall within the protection scope of the present disclosure.

What is claimed is:

1. A motor-linked blowing and sucking structure, comprising:

a cavity tube, in which a swinging vane is disposed, a side wall of the swinging vane contacting an inner wall of the cavity tube; and a linkage, one end of the linkage is connected to a drive motor and an other end of the linkage is connected to the swinging vane, wherein the linkage follows rotation of the drive motor to allow for a fan-shaped reciprocating motion of the swinging vane, thereby achieving an air blowing and sucking effect at an opening end of the cavity tube;

wherein a first opening and a second opening are provided at both ends of the cavity tube; the end of the linkage away from the drive motor is connected to the swinging vane through the first opening; and when the swinging vane is located at a first limit position or a second limit position during the fan-shaped reciprocating motion, an air blowing and sucking effect is achieved at the second opening;

wherein the cavity tube is an arc-shaped tube and further comprises an arc-shaped bridge, one end of the arc-shaped bridge is connected to the linkage and an other end of the arc-shaped bridge is connected to the swinging vane through the first opening; the linkage further comprises a rotating shaft, and the swinging vane makes the fan-shaped reciprocating motion by taking the rotating shaft as a center of rotation; and a radian center formed by the cavity tube is overlapped with the center of rotation of the rotating shaft.

2. The motor-linked blowing and sucking structure according to claim 1, wherein an end surface at an end of the linkage away from the drive motor is an arc surface which fits into an inner arc portion formed by the cavity tube.

3. The motor-linked blowing and sucking structure according to claim 1, wherein an eccentric shaft is sleeved on an output shaft of the drive motor, and the end of the linkage close to the drive motor is provided with a first protrusion and a second protrusion, between which a preset spacing is present; and the eccentric shaft is located within the preset spacing, and is reciprocatively butted against opposing surfaces of the first and second protrusions following the rotation of the drive motor, to drive the swinging vane to make the fan-shaped reciprocating motion.

4. The motor-linked blowing and sucking structure according to claim 3, wherein the eccentric shaft comprises an eccentric column configured to butt against the first and second protrusions, and a flexible sleeve is sleeved on the eccentric column.

5. The motor-linked blowing and sucking structure according to claim 1, wherein a seal ring is sleeved on an outer wall of the swinging vane.

6. The motor-linked blowing and sucking structure according to claim 1, wherein the cavity tube is formed by closing a first tube shell and a second tube shell.

7. The motor-linked blowing and sucking structure according to claim 6, wherein opposing bonding surfaces of the first tube shell and the second tube shell are each provided with a seal groove, and a seal medium is accommodated in a seal channel formed by the two seal grooves.

8. A health care tool, comprising a main body, wherein a battery, the blowing and sucking structure according to claim 1, and a master control board are disposed in the main body, and the drive motor and the battery are connected to the master control board, respectively.

* * * * *